(12) United States Patent
Hsu et al.

(10) Patent No.: US 8,823,350 B2
(45) Date of Patent: Sep. 2, 2014

(54) SWITCHING REGULATOR CAPABLE OF TURNING OFF LOWER GATE SWITCH COMPLETELY DURING ACTIVATION PERIOD

(71) Applicant: Anpec Electronics Corporation, Hsin-Chu (TW)

(72) Inventors: Hung-Ta Hsu, New Taipei (TW); Hsiang-Chung Chang, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 13/674,064

(22) Filed: Nov. 11, 2012

(65) Prior Publication Data

US 2014/0070776 A1    Mar. 13, 2014

(30) Foreign Application Priority Data

Sep. 13, 2012 (TW) .............................. 101133451 A

(51) Int. Cl.
G05F 1/00 (2006.01)
(52) U.S. Cl.
USPC .......................................... 323/283; 323/271
(58) Field of Classification Search
CPC ........................................................ G05F 1/10
USPC .................. 323/222–226, 271–277, 280–287
See application file for complete search history.

(56) References Cited

U.S. PATENT DOCUMENTS

| | | | |
|---|---|---|---|
| 6,583,610 B2 * | 6/2003 | Groom et al. ................. | 323/288 |
| 7,221,134 B1 * | 5/2007 | Ling ............................. | 323/284 |
| 7,411,367 B2 | 8/2008 | Tsai | |
| 7,557,545 B2 * | 7/2009 | Naka et al. .................... | 323/223 |
| 7,932,703 B2 * | 4/2011 | Brohlin et al. ................ | 323/222 |
| 2005/0231177 A1 * | 10/2005 | Tateno et al. ................. | 323/225 |
| 2005/0231181 A1 * | 10/2005 | Bernacchia et al. .......... | 323/274 |
| 2006/0017421 A1 * | 1/2006 | Solie et al. .................... | 323/225 |
| 2006/0087300 A1 * | 4/2006 | Endo et al. .................... | 323/282 |
| 2006/0103365 A1 * | 5/2006 | Ben-Yaacov .................. | 323/313 |
| 2006/0152204 A1 * | 7/2006 | Maksimovic et al. ........ | 323/284 |
| 2006/0158166 A1 * | 7/2006 | Van Der Wal ................. | 323/282 |
| 2007/0120547 A1 * | 5/2007 | Tateishi et al. ................ | 323/282 |
| 2007/0279028 A1 * | 12/2007 | Lee ................................ | 323/284 |
| 2007/0285038 A1 * | 12/2007 | Tsai et al. ..................... | 318/434 |
| 2008/0067989 A1 * | 3/2008 | Kasai et al. ................... | 323/271 |
| 2008/0211473 A1 * | 9/2008 | Tlasksl et al. ................. | 323/283 |
| 2008/0252277 A1 * | 10/2008 | Sase et al. ..................... | 323/283 |
| 2009/0015227 A1 * | 1/2009 | Wong et al. ................... | 323/283 |

(Continued)

FOREIGN PATENT DOCUMENTS

TW    I288999    10/2007
TW    201111937    4/2011

*Primary Examiner* — Timothy J Dole
*Assistant Examiner* — Yusef Ahmed
(74) *Attorney, Agent, or Firm* — Winston Hsu; Scott Margo

(57) ABSTRACT

A switching regulator for outputting an output voltage is disclosed. The switching regulator includes an upper gate switch, for turning on and turning off according to an upper gate control signal; a lower gate switch, coupled to the upper gate switch, for turning on and turning off according to a lower gate control signal; and a logic circuit, for generating the lower gate control signal according to a lower gate off signal. The lower gate switch turns off during an activation period of the switching regulator.

6 Claims, 8 Drawing Sheets

(56) References Cited

U.S. PATENT DOCUMENTS

| | | | |
|---|---|---|---|
| 2010/0327836 A1* | 12/2010 | Li et al. | 323/283 |
| 2011/0012577 A1* | 1/2011 | Wang et al. | 323/283 |
| 2012/0025797 A1* | 2/2012 | Futamura et al. | 323/283 |
| 2012/0043950 A1* | 2/2012 | Truong et al. | 323/282 |
| 2012/0074924 A1* | 3/2012 | Dequina et al. | 323/351 |
| 2012/0126765 A1* | 5/2012 | Stone et al. | 323/283 |
| 2012/0274293 A1* | 11/2012 | Ren et al. | 323/271 |
| 2013/0176008 A1* | 7/2013 | Li et al. | 323/273 |

* cited by examiner

SWITCHING REGULATOR CAPABLE OF TURNING OFF LOWER GATE SWITCH COMPLETELY DURING ACTIVATION PERIOD

BACKGROUND OF THE INVENTION

1. Field of the Invention

The present invention relates to a switching regulator, and more particularly, to a switching regulator capable of turning off a lower gate switch completely during an activation period, to decrease an inductor current rapidly by a conduction of a body diode of the lower gate switch when the lower gate switch is turned off, so as to smooth the inductor current and an output voltage.

2. Description of the Prior Art

Power supply devices play an important role in modern information technology. Among all of the power supply devices, a DC-DC switching regulator is widely utilized, and the major function of the DC-DC switching regulator is to provide a stable output voltage for the electronic components.

In general, a current control DC-DC switching regulator compares a feedback voltage, which is a division voltage of an output voltage, with a reference voltage to generate a voltage error signal, sums a current detection signal related to an inductor current, with a ramp signal to generate a summation signal (for slope compensation), and compares the voltage error signal with the summation signal to control a upper gate switch and a lower gate switch to turn on and off, so as to stabilize the output voltage.

However, during an activation period of the current control DC-DC switching regulator, since the voltage level of the output voltage is smaller, under a situation of the synchronous operations of the upper gate switch and the lower gate switch, after the upper gate switch is turned on and the lower gate switch is turned off and thus the conductor current increases, the conductor current can not effectively decrease when the upper gate switch is turned off and the lower gate switch is turned on. Therefore, the inductor current may continuously increase, such that the output voltage rapidly increases accordingly. Then, when the output voltage reaches a specific voltage, the upper gate switch is turned off continuously and the lower gate switch is turned on continuously. At this moment, the conductor current continuously decreases and the output voltage stays at the specific voltage. As a result, the conductor current and the output voltage are not smooth. Thus, there is a need for improvement of the prior art.

SUMMARY OF THE INVENTION

It is therefore an objective of the present invention to provide a switching regulator, that is capable of turning off a lower gate switch completely during an activation period to decreases an inductor current rapidly by a conduction of a body diode of the lower gate switch under the lower gate switch being turned off, so as to make the inductor current and an output voltage smooth.

The present invention discloses a switching regulator, for outputting an output voltage. The switching regulator includes an upper gate switch, for turning on and turning off according to an upper gate control signal; a lower gate switch, coupled to the upper gate switch, for turning on and turning off according to a lower gate control signal; and a logic circuit, for generating the lower gate control signal according to a lower gate off signal; wherein the lower gate switch turns off during an activation period of the switching regulator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
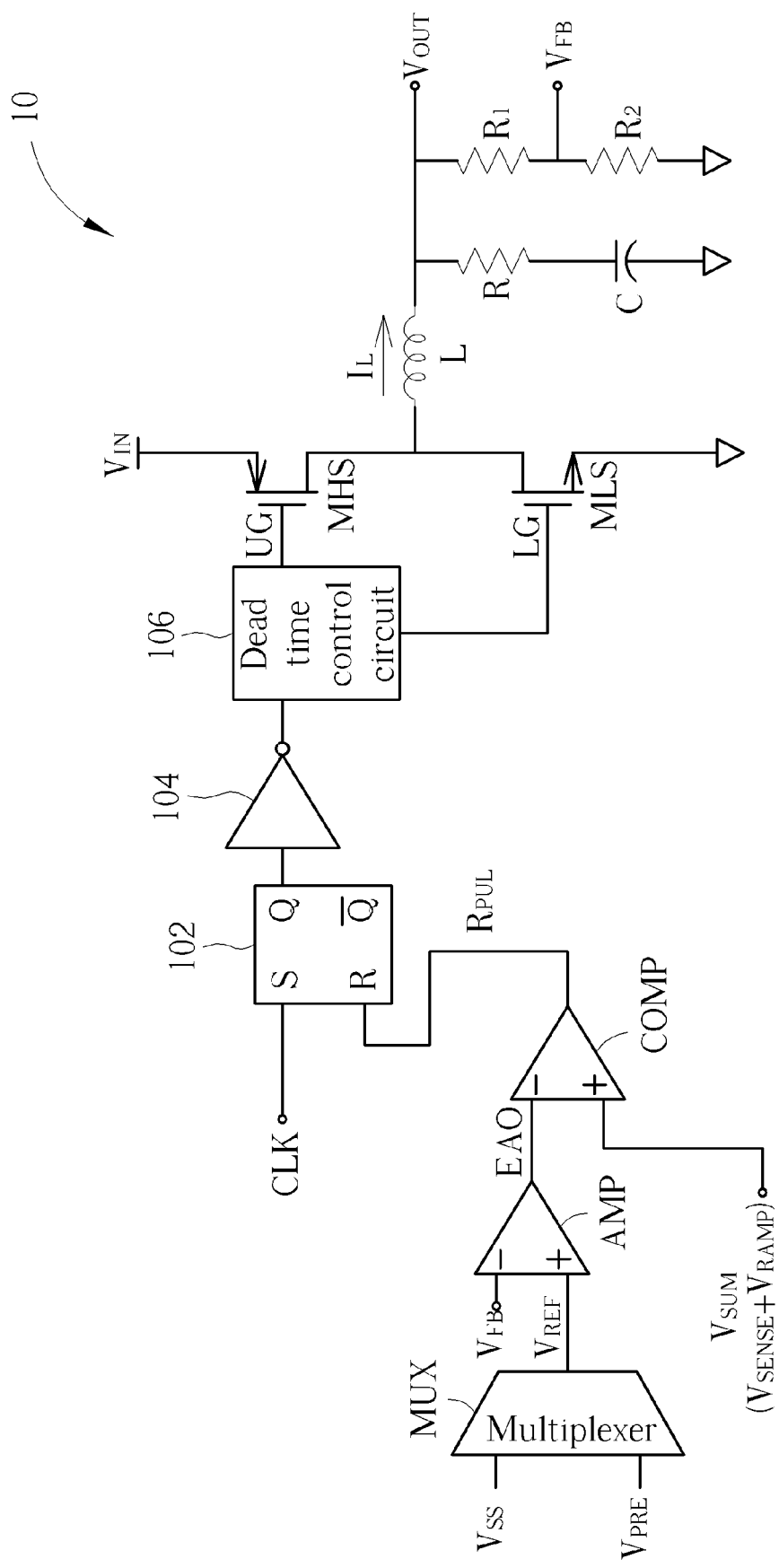
FIG. 1 illustrates a schematic diagram of a current control DC-DC switching regulator.

Please refer to FIG. 1, which illustrates a schematic diagram of a current control DC-DC switching regulator 10. As shown in FIG. 1, the DC-DC switching regulator 10 includes an upper gate switch MHS, a lower gate switch MLS, a multiplexer MUX, a differential amplifier AMP, a comparator COMP, a SR flip-flop 102, an inverter 104, a dead time control circuit 106, an inductor L, a capacitor C, a resistor R, and division resistors R1,R2. The upper gate switch MHS and the lower gate switch MLS are respectively a P-type metal oxide semiconductor field-effect transistor (MOSFET) and an N-type metal oxide semiconductor field-effect transistor (MOSFET).

In short, the multiplexer MUX outputs a slow rising soft start voltage $V_{SS}$ as a reference voltage $V_{REF}$ during an activation period, and outputs a fixed predefined voltage $V_{PRE}$ as the reference voltage $V_{REF}$ during a stable operation period. The differential amplifier AMP compares a feedback voltage $V_{FB}$ (i.e. a division voltage of an output voltage $V_{OUT}$) with the reference voltage $V_{REF}$ to generate a voltage error signal EAO. Then, the comparator COMP compares the voltage error signal EAO with a summation signal $V_{SUM}$ (a summation of a current detection signal $V_{SENSE}$ related to a magnitude of a conductor current $I_L$ and a ramp signal $V_{RAMP}$) to generate a reset signal $R_{PUL}$.

Under such a structure, when a clock signal CLK is a high level and triggers a set terminal of the SR flip-flop 102 to make the inverter 104 to output a low level, the dead time control circuit 106, under a synchronous operation, can properly and separately output an upper gate control signal UG with a low level and a lower gate control signal LG with a low level to control the upper gate switch MHS to turn on and to control the lower gate switch MLS to turn off to prevent the upper gate switch MHS and the lower gate switch MLS from turning on simultaneously. At this moment, energy may be transferred from an input voltage $V_{IN}$ to the conductor L via the upper gate switch MHS to output the conductor current $I_L$ to charge the capacitor C, such that the output voltage $V_{OUT}$ increases (the conductor current $I_L$ also increases).

Next, when the output voltage $V_{OUT}$ and the conductor current $I_L$ increase, the voltage error signal decreases and the summation signal $V_{SUM}$ increases, such that the reset signal $R_{PUL}$ switches to a high level to reset the SR flip-flop 102 through a reset terminal of the SR flip-flop 102 to make the inverter 104 to output a high level (the level of the clock signal CLK is low at this moment). The dead time control circuit 106 can properly and separately output the upper gate control signal UG with a high level and the lower gate control signal LG with a high level to control the upper gate switch MHS to turn off and to control the lower gate switch MLS to turn on under a synchronous operation to prevent the upper gate switch MHS and the lower gate switch MLS turning on simultaneously. At this moment, energy may be transferred to a ground terminal via the lower gate switch MLS, such that the conductor current $I_L$ decreases or even flows toward the ground terminal, so as to charge the capacitor C more slowly, or even to discharge the capacitor C. Therefore, the increasing speed of the output voltage $V_{OUT}$ becomes slow or the output voltage $V_{OUT}$ even decreases. As a result, the DC-DC switching regulator 10 can maintain the output voltage $V_{OUT}$ to a desired voltage level.

Figure 2A:
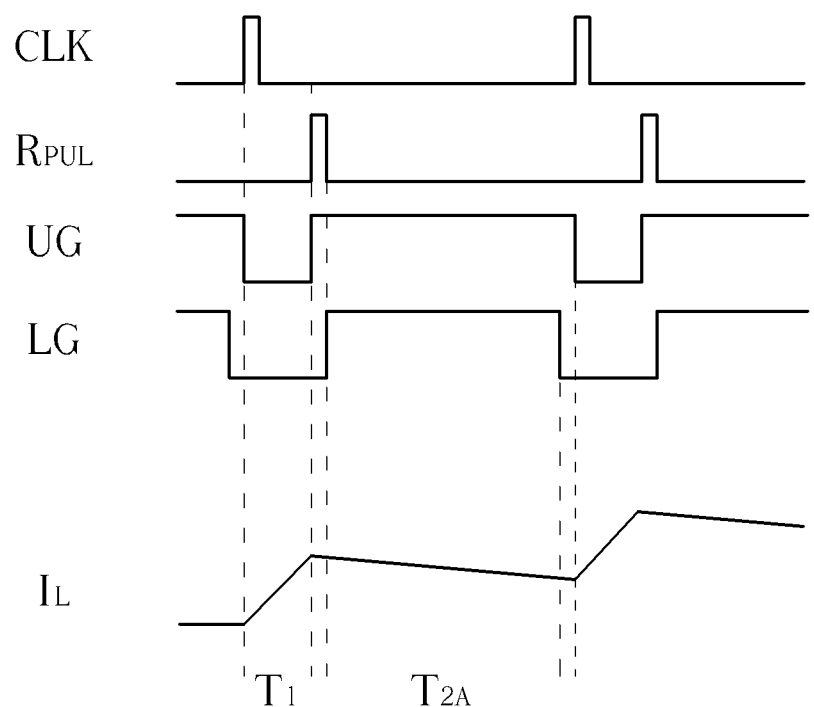
FIG. 2A illustrates a schematic diagram of signals of a DC-DC switching regulator shown in FIG. 1 during an activation period.
Figure 2B:
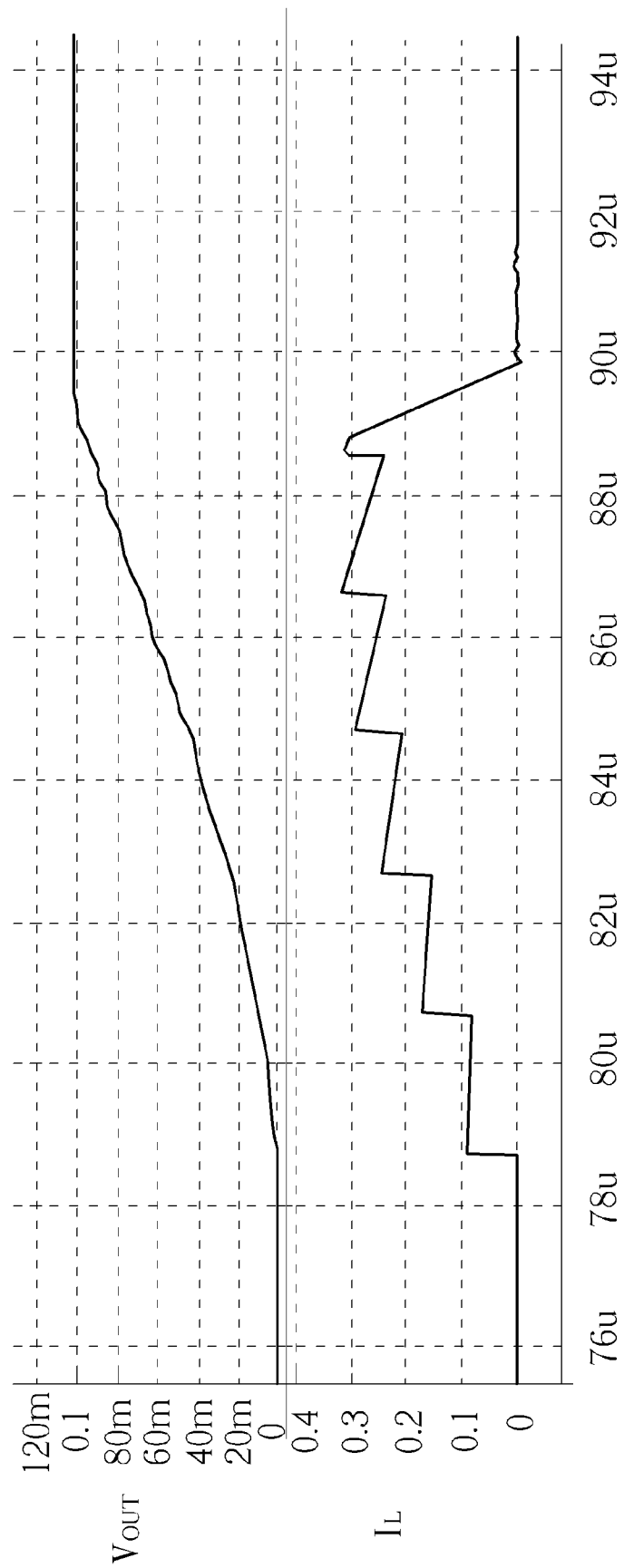
FIG. 2B illustrates a schematic diagram of an inductor current and an output voltage shown in FIG. 1 during an activation period.
Figure 2C:
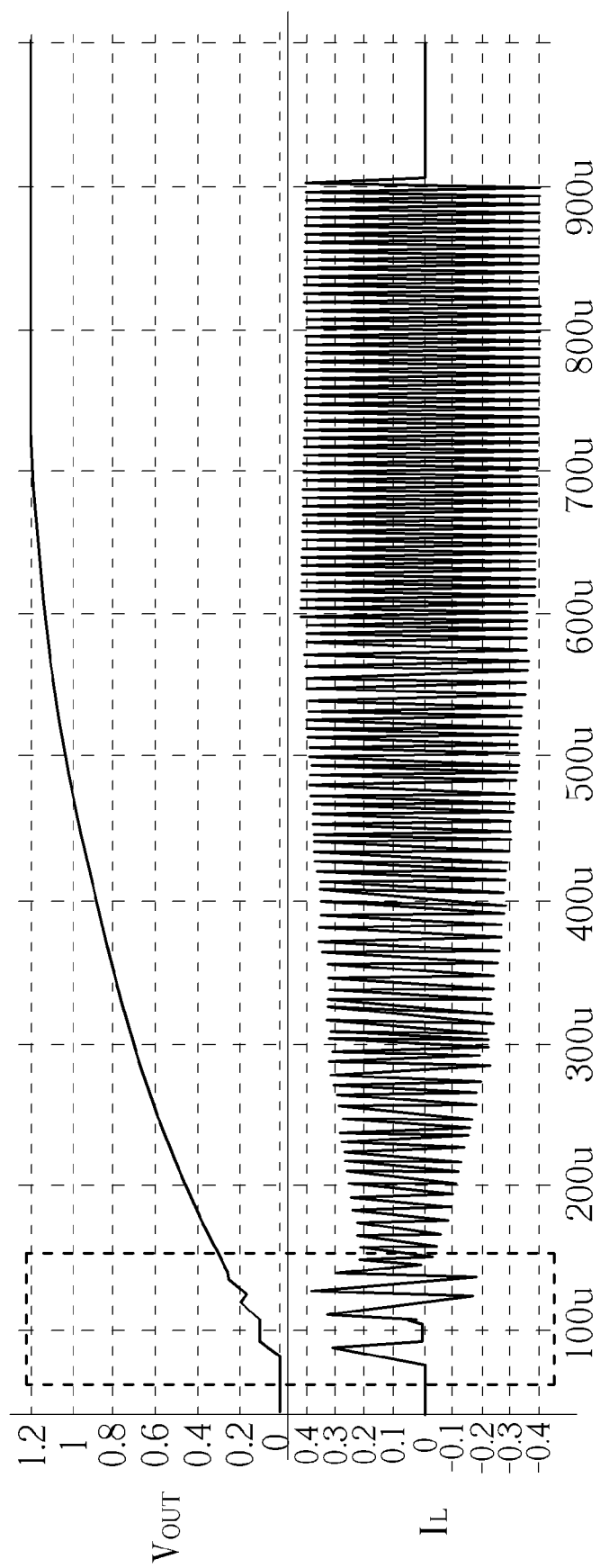
FIG. 2C illustrates a schematic diagram of an inductor current and an output voltage shown in FIG. 1 during an activation period and a stable operation period.

However, under the structure of the DC-DC switching regulator 10, the conductor current $I_L$ and the output voltage $V_{OUT}$ may not be smooth during the activation period. Please refer to FIG. 2A, FIG. 2B, and FIG. 2C. FIG. 2A illustrates a schematic diagram of signals of the DC-DC switching regulator 10 during the activation period. FIG. 2B illustrates a schematic diagram of the inductor current $I_L$ and the output voltage $V_{OUT}$ shown in FIG. 1 during the activation period. FIG. 2C illustrates a schematic diagram of the inductor current $I_L$ and the output voltage $V_{OUT}$ shown in FIG. 1 during the activation period and the stable operation period. As shown in FIG. 1 and FIG. 2A, the clock signal CLK is triggered to be a high level to make the upper gate control signal UG and the lower gate control signal LG to be a low level to control the upper gate switch MHS to turn on and to control the lower gate switch MLS to turn off (the dead time control circuit 106 controls the lower gate switch MLS to turns off first and then controls the upper gate switch to turns on to prevent the input voltage $V_{IN}$ and the ground terminal from being short). Since the output voltage $V_{OUT}$ is very small (close to zero) during the activation period, a slope of the conductor current $I_L$ flowing through the conductor L within a period $T_1$ of the upper gate switch MHS being turned on and the lower gate switch MLS being turned off can be denoted by the following equations:

$$\Rightarrow (V_{IN}-V_{OUT})*T_1=L*\Delta I_L^+$$

$$\Rightarrow dI_L^+/dT=(V_{IN}-V_{OUT})/L$$

$$\Rightarrow dI_L^+/dT=(V_{IN})/L$$

Under such a situation, the slope of the conductor current $I_L$ is positive and the conductor current $I_L$ increases rapidly.

On the other hand, when the output voltage $V_{OUT}$ and the conductor current $I_L$ increase, the voltage error signal decreases and the summation signal $V_{SUM}$ increases, such that the reset signal $R_{PUL}$ switches to a high level to make the upper gate control signal UG and the lower gate control signal LG to be a high level to control the upper gate switch MHS to turn off and to control the lower gate switch MLS to turn on (the dead time control circuit 106 controls the upper gate switch MHS to turn off first and then controls the lower gate switch MLS to turn on to prevent the input voltage $V_{IN}$ and the ground terminal from being short). Since the output voltage $V_{OUT}$ is very small (close to zero) during the activation period, a slope of the conductor current $I_L$ flowing through the conductor L within a period $T_{2A}$ of the upper gate switch MHS being turned off and the lower gate switch MLS being turned on can be denoted by the following equations:

$$\Rightarrow (V_{OUT}-0)\times T_{2A}=L\times \Delta I_L^-$$

$$\Rightarrow dI_L^-/dT=(V_{OUT})/L$$

$$\Rightarrow dI_L^-/dT=(0)/L$$

Under such a situation, the slope of the conductor current $I_L$ is negative, and decreases slowly since the output voltage $V_{OUT}$ is very small.

As shown in FIG. 2A, FIG. 2B, and FIG. 2C (FIG. 2A, FIG. 2B, and FIG. 2C are schematic diagrams of lengthening the operating period sequentially). Since the output voltage $V_{OUT}$ is very small during the activation period, the increased amount of the inductor current $I_L$ during a positive slope period can not be decreased during a negative slope period. Therefore, the inductor current $I_L$ may continuously increase and the output voltage rapidly increases accordingly until the output voltage reaches a specific voltage, and thus the upper gate switch is turned off continuously and the lower gate switch is turned on continuously to decrease the inductor current $I_L$ (as shown in FIG. 2B). Then, the above operation is repeated until the DC-DC switching regulator 10 operates stably. Thus the inductor current $I_L$ and the output voltage $V_{OUT}$ may be not smooth during the activation period (as shown in the period of the dotted line of FIG. 2C).

Figure 3:
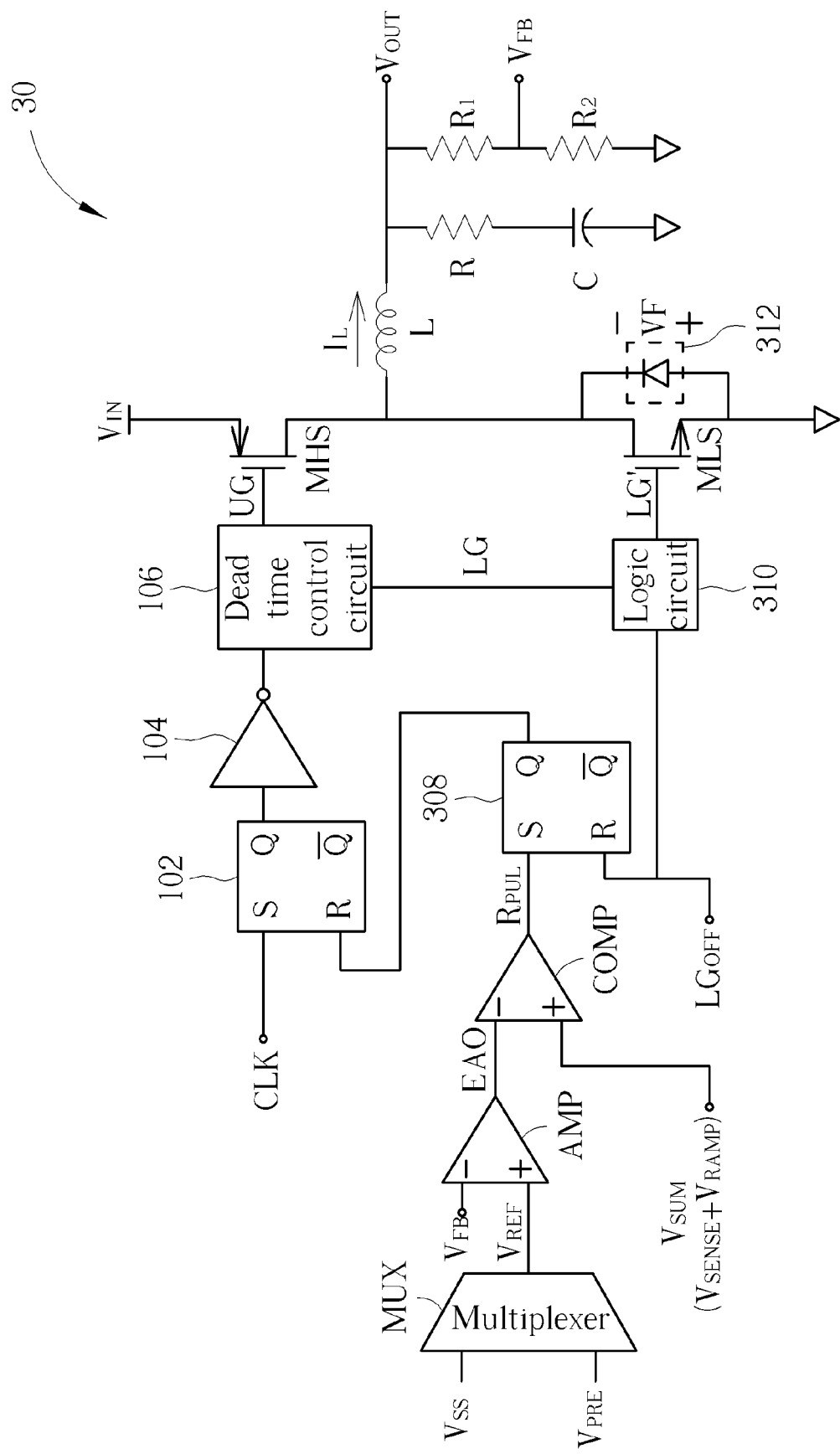
FIG. 3 illustrates a schematic diagram of a current control DC-DC switching regulator 30 according to an embodiment of the present invention.

On the other hand, please refer to FIG. 3, which illustrates a schematic diagram of a current control DC-DC switching regulator 30 according to an embodiment of the present invention. As shown in FIG. 3, the DC-DC switching regulator 30 is partially similar to the DC-DC switching regulator 10, so the components and signals with similar functions are denoted by the same symbols. The DC-DC switching regulator 30 further includes a SR flip-flop 308 and a logic circuit 310. The SR flip-flop 308 is coupled between the comparator COMP and the SR flip-flop 102, and outputs the reset signal $R_{PUL}$ to the reset terminal R of the SR flip-flop 102 according to a lower gate off signal $LG_{OFF}$. The logic circuit 310 is coupled between the dead time control circuit 106 and the lower gate switch MLS, and generates a lower gate control signal LG' according to the lower gate off signal $LG_{OFF}$ to turn off the lower gate switch MLS during an activation period of the DC-DC switching regulator 30. As a result, the DC-DC switching regulator 30 can turnoff the lower gate switch MLS completely during the activation period, to decrease an inductor current $I_L$ rapidly by a conduction of a body diode 312 of the lower gate switch MLS when the lower gate switch MLS is turned off, so as to smooth the inductor current $I_L$ and the output voltage $V_{OUT}$.

Figure 4A:
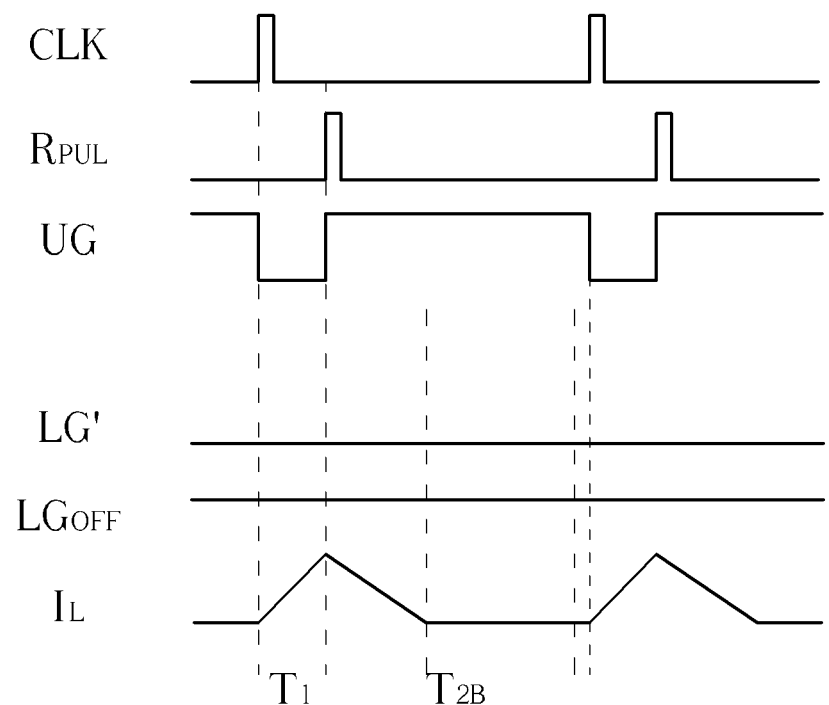
FIG. 4A illustrates a schematic diagram of signals of a DC-DC switching regulator shown in FIG. 3 during an activation period.
Figure 4B:
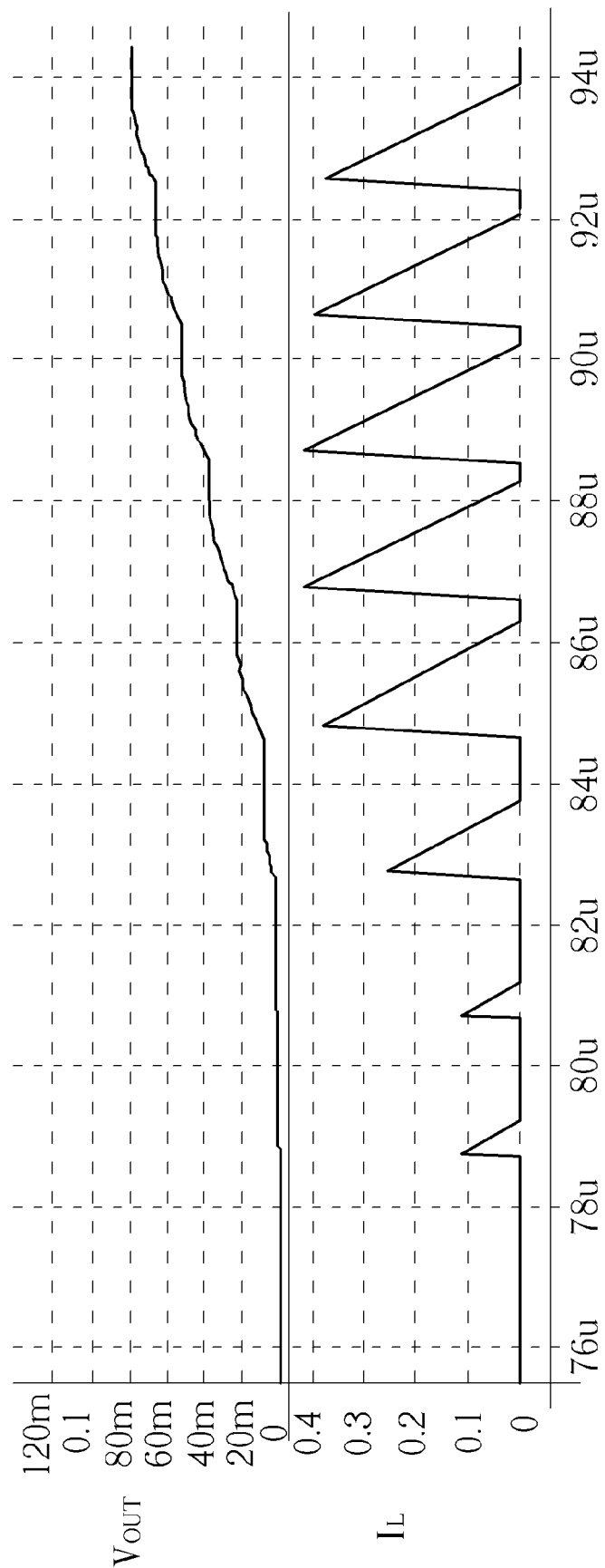
FIG. 4B illustrates a schematic diagram of an inductor current and an output voltage shown in FIG. 3 during an activation period.
Figure 4C:
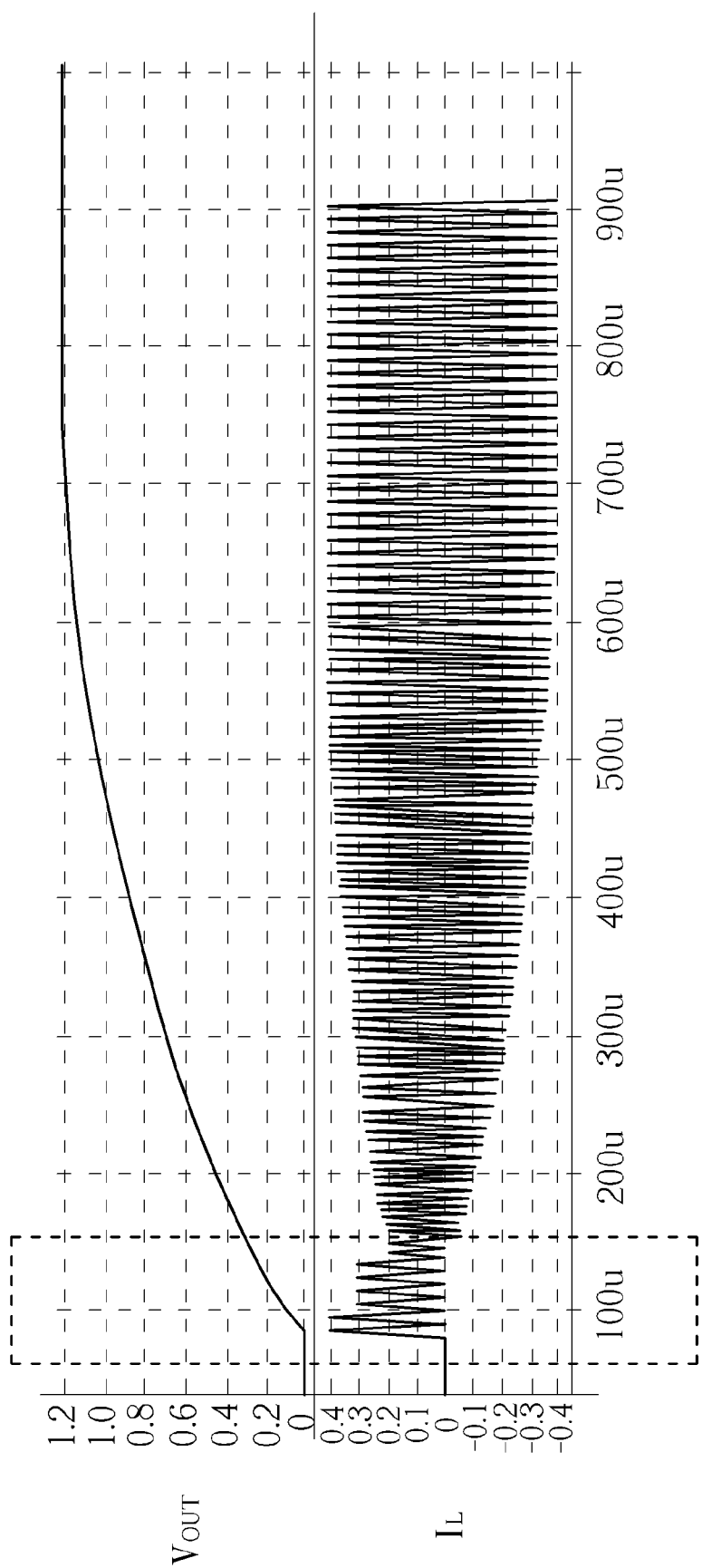
FIG. 4C illustrates a schematic diagram of an inductor current and an output voltage shown in FIG. 3 during an activation period and a stable operation period.

Please refer to FIG. 4A, FIG. 4B, and FIG. 4C. FIG. 4A illustrates a schematic diagram of signals of the DC-DC switching regulator 30 during the activation period. FIG. 4B illustrates a schematic diagram of the inductor current $I_L$ and the output voltage $V_{OUT}$ during the activation period. FIG. 4C illustrates a schematic diagram of the inductor current $I_L$ and the output voltage $V_{OUT}$ during the activation period and the stable operation period. As shown in FIG. 3 and FIG. 4A, the lower gate off signal $LG_{OFF}$ is a high level during the activation period, so the logic circuit 310 controls the lower gate switch MLS to turn off continuously and not be controlled by the dead time control circuit 106. When the clock signal CLK is triggered to be a high level to make the upper gate control signal UG to be a low level to control the upper gate switch MHS to turn on, since the output voltage $V_{OUT}$ is very small (close to zero) during the activation period, a slope of the conductor current $I_L$ flowing the conductor L within a period $T_1$ of the upper gate switch MHS being turned on and the lower gate switch MLS being turned off can be denoted by the following equations:

$$\Rightarrow (V_{IN}-V_{OUT})*T_1 = L*\Delta I_L^+$$

$$\Rightarrow dI_L^+/dT = (V_{IN}-V_{OUT})/L$$

$$\Rightarrow dI_L^+/dT = (V_{IN})/L$$

Under such a situation, the slope of the conductor current $I_L$ is positive and the conductor current $I_L$ increases rapidly.

On the other hand, when the output voltage $V_{OUT}$ and the conductor current $I_L$ increase, the voltage error signal decreases and the summation signal $V_{SUM}$ increase, such that the reset signal $R_{PUL}$ switches to a high level to make the upper gate control signal UG to be a high level to control the upper gate switch MHS to turn off. Since the output voltage $V_{OUT}$ is very small (close to zero) during the activation period, a slope of the conductor current $I_L$ flowing the conductor L within a period $T_{2B}$ of the upper gate switch MHS being turned off and the lower gate switch MLS being turned off (under such a situation, the body diode 312 of the lower gate switch MLS is conducted) can be denoted by the following equations:

$$\Rightarrow (V_{OUT}+VF) \times T_{2B} = L \times \Delta I_L^-$$

$$\Rightarrow dI_L^-/dT = (V_{OUT}+VF)/L$$

$$\Rightarrow dI_L^-/dT = (VF)/L$$

Under such a situation, the slope of the conductor current $I_L$ is negative and the conductor current $I_L$ can decrease to zero since the body diode 312 of the lower gate switch MLS is conducted and has a voltage VF cross the body diode 312 of the lower gate switch MLS.

As shown in FIG. 4A, FIG. 4B, and FIG. 4C (FIG. 4A, FIG. 4B, and FIG. 4C are schematic diagrams of lengthening the operating period sequentially). When the upper gate switch MHS is turned off during the activation period, the lower gate switch is also turned off. Thus, the increased amount of the inductor current IL during a positive slope period can be decreased rapidly by a conduction of the body diode 312 of the lower gate switch MLS during a negative slope period, such that the inductor current IL can increase and then decrease to zero completely during every period. Therefore, the output voltage $V_{OUT}$ can increase smoothly (as shown in FIG. 4B) until the DC-DC switching regulator 30 operates stably and switches the lower gate off signal LGOFF to be a low level, such that the logic circuit 310 generates the lower gate control signal LG' according to the dead time control circuit 106. Thus, the inductor current IL and the output voltage $V_{OUT}$ can be more smooth during the activation period (as shown in the period of the dotted line of FIG. 4C).

Noticeably, the spirit of the present invention is to turnoff the lower gate switch completely during the activation period to decrease an inductor current rapidly by a conduction of a body diode of the lower gate switch when the lower gate switch is turned off, so as to smooth the inductor current $I_L$ and the output voltage $V_{OUT}$. Those skilled in the art can make modifications or alterations accordingly. For example, the logic circuit 310 may be implemented by a multiplexer, which outputs a low level signal (i.e. a predefined level signal) as the lower gate control signal LG' when the lower gate off signal $LG_{OFF}$ is a high level, and outputs the lower gate control signal LG from the dead time control circuit 106 as the lower gate control signal LG' when the lower gate off signal $LG_{OFF}$ is a low level. In other embodiment, the logic circuit 310 can be implemented by other methods, as long as the functions can be achieved. Besides, the above activation period of the DC-DC switching regulator 30 can be set as a specific period after the DC-DC switching regulator 30 activates, or a period after the switching regulator activates and the output voltage is less than a specific voltage, and is not limited herein.

In the prior art, during the activation period of the current control DC-DC switching regulator, since the voltage level of the output voltage is smaller, after the conductor current increases, the conductor current can not effectively decrease. Therefore, the inductor current may continuously increase, such that the output voltage rapidly increases accordingly. Then, when the output voltage reaches a specific voltage, the conductor current continuously decreases to maintain the output voltage to the specific voltage. As a result, the conductor current and the output voltage are caused to be not smooth.

In comparison, the present invention turns off the lower gate switch completely during the activation period to decrease the inductor current rapidly by a conduction of a body diode of the lower gate switch when the lower gate switch is turned off, so as to smooth the inductor current and an output voltage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching regulator, for outputting an output voltage, comprising: an upper gate switch, for turning on and turning off according to an upper gate control signal; a lower gate switch, coupled to the upper gate switch, for turning on and turning off according to a lower gate control signal; and a logic circuit, for generating the lower gate control signal according to a lower gate off signal; wherein the lower gate switch turns off completely during an activation period comprising a plurality of positive slope periods and a plurality of negative slope periods of the switching regulator, and the output voltage is too small during the activation period such that an increased amount of an inductor current flowing through an inductor during one of the plurality of positive slope periods during which the upper gate switch turns on is not effectively decreased if the lower gate switch turns on during one of the plurality of negative slope periods following the one of the plurality of positive slope periods; wherein the logic circuit is a multiplexer for selecting a predefined level signal or a control signal as the lower gate control signal according to the lower gate off signal.

2. The switching regulator of claim 1, wherein the upper gate switch and the lower gate switch are respectively a P-type metal oxide semiconductor field-effect transistor (MOSFET) and an N-type metal oxide semiconductor field-effect transistor (MOSFET).

3. The switching regulator of claim 1, wherein when the upper gate switch turns on, a slope of the inductor current flowing through the inductor is positive.

4. The switching regulator of claim 1, wherein when the upper gate switch turns off during the activation period of the switching regulator, a body diode of the lower gate switch is conducted and a slope of the inductor current flowing through the inductor is negative.

5. The switching regulator of claim 1, wherein the activation period is a period after the switching regulator activates, and the increased amount of the inductor current flowing through the inductor during the one of the plurality of positive slope periods is not effectively decreased if the lower gate switch turns on during the one of the plurality of negative slope periods following the one of the plurality of positive slope periods during the period.

6. The switching regulator of claim 1, wherein the activation period is a period after the switching regulator activates and the output voltage is less than a voltage such that the increased amount of the inductor current flowing through the inductor during the one of the plurality of positive slope periods is not effectively decreased if the lower gate switch turns on during the one of the plurality of negative slope periods following the one of the plurality of positive slope periods.

* * * * *